(12) United States Patent
Speidel

(10) Patent No.: US 11,863,250 B2
(45) Date of Patent: Jan. 2, 2024

(54) SATELLITE COMMUNICATION SYSTEM TRANSMITTING NAVIGATION SIGNALS USING A WIDE BEAM AND DATA SIGNALS USING A DIRECTIVE BEAM

(71) Applicant: Lynk Global, Inc., Falls Church, VA (US)

(72) Inventor: Tyghe Robert Speidel, Washington, DC (US)

(73) Assignee: Lynk Global, Inc., Falls Church, VA (US)

( * ) Notice: Subject to any disclaimer, the term of this patent is extended or adjusted under 35 U.S.C. 154(b) by 0 days.

(21) Appl. No.: 17/570,329

(22) Filed: Jan. 6, 2022

(65) Prior Publication Data

US 2022/0216896 A1 Jul. 7, 2022

Related U.S. Application Data

(60) Provisional application No. 63/134,213, filed on Jan. 6, 2021.

(51) Int. Cl.
*H04B 7/0408* (2017.01)
*H04B 7/0426* (2017.01)
(Continued)

(52) U.S. Cl.
CPC .......... *H04B 7/0408* (2013.01); *H01Q 1/288* (2013.01); *H01Q 5/28* (2015.01); *H01Q 21/065* (2013.01); *H01Q 25/002* (2013.01); *H04B 7/043* (2013.01)

(58) Field of Classification Search
CPC ........ H01Q 1/288; H01Q 25/002; H01Q 5/28; H01Q 21/065; H04B 7/18513;
(Continued)

(56) References Cited

U.S. PATENT DOCUMENTS 4,218,654 A 8/1980 Ogawa et al.
4,968,981 A * 11/1990 Sekine .................... G01S 19/30
375/150
(Continued)

FOREIGN PATENT DOCUMENTS

AU 714923 1/2000
CN 1346219 A 4/2002
(Continued)

OTHER PUBLICATIONS

Ivanov et al. (Mobile Communication System with a Hybrid Phased Array Antenna System, Jun. 2016 ((added to IEEExplore), pp. 1-4 IEEE. (Year: 2016).*
(Continued)

*Primary Examiner* — Sophia Vlahos
(74) *Attorney, Agent, or Firm* — Haynes and Boone, LLP

(57) ABSTRACT

A satellite communications system can comprise at least one that satellite, an antenna structure deployed on the at least one satellite, and radio hardware coupled to the antenna structure that can provide for transmitting a first channel simultaneously with a second channel, wherein the first channel is transmitted using directive beams and the second channel is transmitted using a wide beam and wherein the directive beams are for data communication signals and the wide beam is for navigation signals.

20 Claims, 5 Drawing Sheets

(51) Int. Cl.
    *H01Q 1/28*     (2006.01)
    *H01Q 25/00*    (2006.01)
    *H01Q 21/06*    (2006.01)
    *H01Q 5/28*     (2015.01)

(58) Field of Classification Search
    CPC .... H04B 7/18508; H04B 7/2041; H04B 7/0408;
                   H04B 7/043; H04B 7/18515; H04H
                   20/74; H04W 84/06
    See application file for complete search history.

(56) References Cited

U.S. PATENT DOCUMENTS

| | | | |
|---|---|---|---|
| 5,592,175 A * | 1/1997 | Tayloe | G01S 5/12 455/12.1 |
| 5,642,355 A | 6/1997 | Smith | |
| 5,841,766 A | 11/1998 | Dent et al. | |
| 5,907,541 A * | 5/1999 | Fairholm | H04B 7/18563 370/321 |
| 5,943,324 A | 8/1999 | Ramesh et al. | |
| 5,991,598 A | 11/1999 | Nawata | |
| 6,008,758 A | 12/1999 | Campbell | |
| 6,031,826 A | 2/2000 | Hassan | |
| 6,084,865 A | 7/2000 | Dent | |
| 6,101,177 A | 8/2000 | Bodin et al. | |
| 6,157,621 A | 12/2000 | Brown et al. | |
| 6,404,769 B1 | 6/2002 | Kapoor | |
| 6,453,236 B1 * | 9/2002 | Aoki | G01C 21/36 701/454 |
| 6,493,322 B1 | 12/2002 | Chemmakeshu et al. | |
| 6,553,225 B1 | 4/2003 | Zhao et al. | |
| 6,606,309 B1 | 8/2003 | Wang | |
| 7,257,371 B1 | 8/2007 | Bettinger et al. | |
| 7,358,899 B1 | 4/2008 | Ville et al. | |
| 7,366,463 B1 * | 4/2008 | Archer | H04B 7/18563 455/12.1 |
| 7,471,720 B2 | 12/2008 | Ram et al. | |
| 7,502,382 B1 | 3/2009 | Liu et al. | |
| 7,515,566 B2 | 4/2009 | Dale et al. | |
| 7,574,224 B2 | 8/2009 | Lane et al. | |
| 7,792,488 B2 | 9/2010 | Karabinis et al. | |
| 8,078,101 B2 | 12/2011 | Karabinis et al. | |
| 8,538,327 B2 | 9/2013 | Sayeed et al. | |
| 8,665,771 B2 | 3/2014 | Nam et al. | |
| 8,705,436 B2 | 4/2014 | Dutta et al. | |
| 8,712,321 B1 * | 4/2014 | Dankberg | H04B 7/2041 455/12.1 |
| 9,042,408 B2 | 5/2015 | Gaal et al. | |
| 9,184,629 B2 | 11/2015 | Miller et al. | |
| 9,628,956 B1 | 4/2017 | Kim | |
| 9,788,306 B2 | 10/2017 | Chen et al. | |
| 9,900,856 B2 | 2/2018 | Wu et al. | |
| 9,954,601 B2 | 4/2018 | Buer et al. | |
| 9,973,266 B1 | 5/2018 | Avellan et al. | |
| 10,084,535 B1 | 9/2018 | Speidel et al. | |
| 2001/0022779 A1 | 9/2001 | Wheatley et al. | |
| 2002/0057745 A1 | 5/2002 | Friedman | |
| 2002/0060995 A1 | 5/2002 | Cervello et al. | |
| 2002/0135510 A1 * | 9/2002 | Bruno | G01S 19/05 701/470 |
| 2002/0151273 A1 | 10/2002 | Marko | |
| 2002/0164986 A1 | 11/2002 | Briand et al. | |
| 2002/0177403 A1 | 11/2002 | LaPadre et al. | |
| 2003/0028339 A1 | 2/2003 | Caso et al. | |
| 2004/0192197 A1 | 9/2004 | Capots et al. | |
| 2004/0192201 A1 | 9/2004 | Febvre et al. | |
| 2006/0246913 A1 | 11/2006 | Merboth et al. | |
| 2006/0285481 A1 | 12/2006 | Lane et al. | |
| 2007/0078541 A1 | 4/2007 | Rogers | |
| 2007/0155316 A1 | 7/2007 | Monte et al. | |
| 2007/0184778 A1 | 8/2007 | Mechaley, Jr. | |
| 2007/0192805 A1 | 8/2007 | Dutta et al. | |
| 2007/0216574 A1 * | 9/2007 | Huang | G01S 19/41 342/357.24 |
| 2007/0218931 A1 | 9/2007 | Beadle et al. | |
| 2008/0143589 A1 | 6/2008 | Dankberg et al. | |
| 2008/0279128 A1 | 11/2008 | Hassan et al. | |
| 2008/0311844 A1 * | 12/2008 | Eidenschink | H04B 7/2125 455/3.02 |
| 2010/0062706 A1 * | 3/2010 | Mills | H04H 20/12 455/13.2 |
| 2010/0220780 A1 | 9/2010 | Peng et al. | |
| 2010/0220782 A1 | 9/2010 | Peng et al. | |
| 2010/0322337 A1 | 12/2010 | Ylitalo et al. | |
| 2011/0013678 A1 | 1/2011 | Smith | |
| 2011/0135043 A1 | 6/2011 | Downey et al. | |
| 2011/0312320 A1 * | 12/2011 | Moeglein | G01S 19/252 455/427 |
| 2012/0302160 A1 | 11/2012 | Silny et al. | |
| 2013/0214968 A1 * | 8/2013 | Parr | G01S 5/12 342/357.23 |
| 2014/0105054 A1 | 4/2014 | Sægrov et al. | |
| 2015/0103723 A1 | 4/2015 | Kim et al. | |
| 2016/0037434 A1 | 2/2016 | Gopal et al. | |
| 2016/0080072 A1 | 3/2016 | Baudoin et al. | |
| 2016/0205560 A1 | 7/2016 | Hyslop et al. | |
| 2017/0212247 A1 * | 7/2017 | Chen | G01S 19/41 |
| 2017/0324465 A1 | 11/2017 | Sotom et al. | |
| 2018/0022474 A1 | 1/2018 | Meek | |
| 2018/0034538 A1 | 2/2018 | Baudoin et al. | |
| 2018/0069651 A1 | 3/2018 | Davydov et al. | |
| 2018/0138968 A1 | 5/2018 | Auer | |
| 2018/0254824 A1 | 9/2018 | Speidel et al. | |
| 2018/0254825 A1 | 9/2018 | Speidel et al. | |
| 2019/0378356 A1 * | 12/2019 | Fang | G07C 5/008 |
| 2020/0006761 A1 | 1/2020 | Siomina | |
| 2020/0244349 A1 | 7/2020 | Speidel et al. | |

FOREIGN PATENT DOCUMENTS

| | | | |
|---|---|---|---|
| CN | 101124742 A | | 2/2008 |
| CN | 101166360 A | | 4/2008 |
| CN | 101455012 A | | 6/2009 |
| CN | 102307167 A | | 1/2012 |
| CN | 103036607 A | | 4/2013 |
| CN | 109283554 A | * | 1/2019 |
| CN | 110086000 A | * | 8/2019 |
| JP | 4207529 | | 7/1992 |
| JP | 2003115827 A | | 4/2003 |
| JP | 2003134022 A | | 5/2003 |
| JP | 2009526501 A | | 7/2009 |
| WO | 2009043305 A1 | | 4/2009 |
| WO | 2016195813 A2 | | 12/2016 |
| WO | 2016209332 A2 | | 12/2016 |
| WO | 2017072745 A1 | | 5/2017 |
| WO | 2017124004 A1 | | 7/2017 |

OTHER PUBLICATIONS

Fletcher et al., "Undersea laser communication with narrow beams," IEEE Communications 1-17 Magazine 53.11 (2015): 49-55. Nov. 9, 2015.
International Search Report issued in PCT Application No. PCT/US2022/011501, dated Apr. 18, 2022.
International Search Report Issued in PCT Application No. PCT/US2018/020205, dated May 17, 2018.
Coulom et al., "Low Earth Orbit satelitte payload for Personal Communications" 3rd European Conference on Satelitte Communications (ECSC-3), Nov. 2, 1993, 5 Pages.
Radharkrishnan et al., "Survey of Inter-Satelitte Communication for Small Satelitte Systems: Physical Layer to Network Layer View" IEEE Communications Surveys & Tutorials 18(4): 2442-2473, May 9, 2016.
Supplemental European Search Report for EPO Application EP 18 76 1611, dated Jun. 28, 2021.
Office Action Issued for Eurasian Patent Application No. 201991901, 5 pages.
Meulenber et al. "LEO-based optical/microwave terrestrial communications" International Astronautical Federation—59th International Astronautical Congress 2008, IAC 2008.

(56) References Cited

OTHER PUBLICATIONS

Search Report Issued for Eurasian Patent Application No. 202292710, 3 pages.
Extended European Search Report, Application No. 18761611.5, dated Jun. 28, 2021.
Hemmati, "Laser Communications: From Terrestrial Broadband to Deep-space", 2014 16th International Conference on Transparent Optical Networks (ICTON), IEEE, 2014, pp. 1-3.

* cited by examiner

SATELLITE COMMUNICATION SYSTEM TRANSMITTING NAVIGATION SIGNALS USING A WIDE BEAM AND DATA SIGNALS USING A DIRECTIVE BEAM

CROSS-REFERENCES TO PRIORITY AND RELATED APPLICATIONS

This application is a non-provisional of, and claims the benefit of and priority from, U.S. Provisional Patent Application No. 63/134,213 filed Jan. 6, 2021, entitled "Method for GNSS using a low earth orbit satellite communications constellation."

The following applications are related and may be referenced herein:

1) U.S. patent application Ser. No. 15/857,073, filed Dec. 28, 2017, entitled "Method and Apparatus for Handling Communications between Spacecraft Operating in an Orbital Environment and Terrestrial Telecommunications Devices That Use Terrestrial Base Station Communications" (hereinafter "Speidel I");
2) U.S. patent application Ser. No. 15/910,959, filed Mar. 2, 2018, entitled "Simplified Inter-Satellite Link Communications Using Orbital Plane Crossing to Optimize Inter-Satellite Data Transfers," now U.S. Pat. No. 10,742,311 (hereinafter "Speidel II");
3) U.S. patent application Ser. No. 15/916,909 filed Mar. 9, 2018, entitled "Method and Apparatus for Handling Communications Between Spacecraft Operating in an Orbital Environment and Terrestrial Telecommunications Devices that Use Terrestrial Base Station Communications," now U.S. Pat. No. 10,084,535 (hereinafter "Speidel III");
4) U.S. patent application Ser. No. 17/274,374 filed Mar. 8, 2021, entitled "Cellular Core Network and Radio Access Network Infrastructure and Management in Space" (hereinafter "Speidel IV").

The entire disclosure(s) of application(s)/patent(s) recited above is(are) hereby incorporated by reference, as if set forth in full in this document, for all purposes.

FIELD

The present disclosure generally relates to satellite communication systems and more particularly to a transmitter for transmitting multiple types of signals.

BACKGROUND

Satellites have been used to provide navigation signals that might be used by a receiver to determine various navigational parameters related to the receiver, such as the receiver's position, the receiver's velocity, etc. Examples of global navigation satellite systems (GNSS) include the Global Positioning System (GPS), the Russian Global Navigation Satellite System (GLONASS), European Union's Galileo navigation satellite system, and China's BeiDou navigation satellite system. These GNSS typically involve a constellation of satellites, orbiting in medium Earth orbits (MEO) or above.

Navigation signals from these GNSS satellites might be radio frequency (RF) transmissions directed at the surface of the Earth encoded such that multiple transmissions from multiple GNSS satellites can be received by a receiver and processed to determine a set of navigation parameters for the receiver. Navigation parameters might include a latitude value for a current position of the receiver, a longitude value for the current position of the receiver, an altitude value for the current position of the receiver, a velocity value for a current velocity of the receiver, a current timestamp (e.g., current date and time for an agreed upon epoch), and other navigation parameters that might be determined using satellite-receiver communications. Of course, use of navigation parameters so obtained need not be limited to navigation as there can be other purposes a receiver or a user of a receiver might have for the set of navigation parameters.

Determining navigation parameters from satellite-receiver communications might take into account a known or determined position and/or velocity of the satellite sending the transmission. In some instances, navigation parameters might be referred to as Position, Navigation, and Timing (PNT) parameters. In some uses, navigation parameters are categorized as "inertial state" parameters, such as position and velocity, and "time" parameters, such as a current date and time, or a timespan between a current instant and some predetermined prior time (such as the number of milliseconds between 12:00 AM, Jan. 1, 1970 GMT and the current time. Thus, the time parameters can be relative to some reference. Inertial state parameters might be relative to some predetermined or agreed to reference frame. For example, position might be relative to x, y, and z coordinates in an orthogonally defined frame of reference such as an Earth-Centered Inertial (ECI) reference frame or an Earth-Centered, Earth-Fixed (ECEF) reference frame.

Global navigation satellite systems have typically been deployed by civil or governmental entities with substantial funding and can involve costly constellation designs wherein, by design, relatively few satellites are used and they are not designed to be replenished often. Fewer satellites can result in lower accuracy and if more satellites are available to a receiver at a time of computing navigation parameters for the receiver, more accurate parameters might be obtained. For example, a receiver might be able to unambiguously determine its position in three dimensions near the surface of the Earth and its current clock time if it received signals from four satellites but might not be able to do so if at the time only two satellites are in range of the receiver.

A computation of a set of navigation parameters for a receiver based on navigation signals received from GNSS satellites (e.g., a satellite that, in addition to possibly other functionality, provides navigation signals usable by receiver) might be referred to as a "navigation solution" computation. Computing a navigation solution might involve receiving multiple signals, distilling from those multiple signals a set of measurements, and solving a system of equations. Each additional satellite transmission can provide additional measurements to assist with solving the system of equations to compute the navigation solution.

Where a GNSS constellation comprises only a few satellites, such as a few dozen usually equally spaced around the Earth, the satellites typically must deploy vast fields of view to create signal coverage over an area wide enough to provide enough satellite signals at any one point around the globe. Low elevation angles and long slant ranges significantly impact link budget performance. As a result, signal energy flux levels (watts per square meter) from current GNSS satellites can be fragile, making signals susceptible to jamming and coverage challenges in geographically disadvantaged locations (e.g., in buildings, in cities, in mountains, etc.). As some examples, Table 1 shows the number of satellites, altitudes, and inclinations for each of some example GNSS constellations.

TABLE 1

| GNSS | Number of Satellites | Altitude (km) | Inclination (°) |
|---|---|---|---|
| GPS | 31 | 20,200 | 55 |
| GLONASS | 26 | 19,100 | 64.8 |
| Galileo | 30 | 23,220 | 56 |
| BeiDou (MEO) | 27 | 21,500 | 55 |

The coverage can be increased by combinations of increased numbers of satellites or with higher altitudes, but the orbital inclination is also important for extending coverage into the polar regions. This is particularly important for Low Earth Orbit (LEO) satellites. Satellites at higher altitudes can also improve the reach into the polar regions but this incurs additional time delays and link budget problems.

Various current GNSS constellations were developed separately, each designed to provide global coverage and reach. Each has its own unique encoded signal architecture, and thus, unique receiver hardware/software. Some recent GNSS receivers improve their accuracy of their navigation solution by hosting hardware and software capable of leveraging multiple GNSS satellite systems. This is a robust solution but increases the complexity and cost of current multi-GNSS solutions.

A GNSS protocol and architecture might involve considerable overhead, delay, and processing, which might not be a concern where navigation parameters are computed infrequently and receiver processing is not constrained. As an example of what might be involved in a protocol for a GNSS transmission, consider a protocol for a GPS GNSS navigation message. One navigation message, often referred to as the "Master Frame", comprises 25 frames, each frame comprises five subframes, each subframe comprises ten words, and each word is a 30-bit word. Thus, a Master Frame comprises 25×5×10×30=37,500 bits. With a 50 bits/second (bps) transmission rate, a full Master Frame requires 37,500/50=750 seconds, or 12.5 minutes, to transmit. On a completely cold start, a GPS receiver with no prior knowledge might not receive the whole Master Frame at once and so the time-to-first-fix (TTFF) at which the receiver can start to infer its set of navigation parameters might take even more than that 12.5 minutes. Table 2 depicts the structure of one of the 25 frames that comprises the Master Frame.

TABLE 2

Frame Structure for GPS Navigation Message

| Subframe | Page Count | Word 1 | Word 2 | Words 3-10 |
|---|---|---|---|---|
| 1 | 1 | TLM | HOW | Clock correction, GPS week, satellite health, etc. |
| 2 | 1 | TLM | HOW | Ephemeris |
| 3 | 1 | TLM | HOW | Ephemeris |
| 4 | 25 | TLM | HOW | Subframe 4 contains 25 subcommutated pages: Ionosphere, PRN 25-32 Satellite Almanac and Health, UTC, etc. |
| 5 | 25 | TLM | HOW | Subframe 5 contains 25 subcommutated pages: PRN 1-24 Satellite Almanac and Health, etc. |

Each subframe begins with the same two words: a telemetry word (TLM) and a handover word (HOW). The satellite generates these two words, but words 3-10 come from a command-and-control system. The telemetry word indicates a status of uploading from a control segment while it is in progress and contains information about an age of ephemeris data. It also has a constant, unchanging 8-bit preamble of 10001011, and a string that helps the receiver reliably find the beginning of each subframe. The handover word provides the receiver information on the time of the GPS week (TOW) and the number of the subframe, among other things. GPS time restarts each Sunday at midnight (0:00 o'clock). The TOW contains the time since the last restart of GPS time on the previous Sunday at 0:00 o'clock. The 3rd through 10th words in each subframe are variable. The first subframe includes data about a clock correction, GPS satellite health, etc. Subframes 2 and 3 are devoted to the ephemeris. Subframes 4 and 5 provide information about ionosphere corrections, PRN (Pseudo Random Noise) satellite numbers (or codes), and almanac data. The PRN term is used because the GPS signals use spread spectrum coding and appear like random noise. The PRN numbers 25 to 32 in subframe 4 mean that satellite's almanacs are found from number 25 to number 32. The PRN numbers 1 to 24 indicate that almanacs from satellites 1 to 24 are located in subframe 5.

When a receiver acquires a navigation message from one satellite, the message includes information that informs the receiver where it can find the rest of the entire constellation in the sky. This helps GPS receivers to acquire the additional satellites after the first one is acquired, but this process could take some time to get to a first fix.

Assisted GPS (A-GPS) technology can help mobile phones with GPS receivers get a shorter time-to-first-fix and possibly improve GNSS sensitivity. An A-GPS system will transmit the latest ephemeris and almanac information as well as differential corrections for time delay through the local ionosphere. It transmits this to the mobile devices via terrestrial mobile networks and can do so at a higher data rate. In support of A-GPS, mobile standards such as 3GPP's documents TS 23.041, TS 25.302, TS 25.215, and TS25.171 provide for Cellular Broadcast of GPS along with Differential Corrections for local conditions. However, such tools might not always be available, such as where terrestrial mobile networks are not available.

A-GPS systems typically require that a mobile phone incorporates a GPS receiver, which is not so common among low-end mobile phones in much of the world targeted for land mobile satellite service. A geographically isolated phone with no terrestrial service might not have a GPS receiver built-in, and its owner may need to call for emergency service with the local country's "E911" or equivalent facility, but without a GPS module in the phone, traditional geolocation techniques would fail for such an isolated user. Even if there is a terrestrial mobile network available, there might be the need for geolocation without having originated an emergency "E911"-type call, such as for determining the national location of a device that is to terminate a connection, and the network must first determine its relevant regulatory regime and the territorial assignment of particular land mobile satellite service providers.

Long delays in obtaining the first fix can be a disadvantage, such as where a geolocation fix within the satellite network needs to complete quickly. Improvements in GNSS availability are desirable.

SUMMARY

A satellite system can provide data signals as well as navigation signals and might operate in Low Earth Orbit (LEO). A satellite communications system can comprise at least one that satellite, an antenna structure deployed on the at least one satellite, and radio hardware coupled to the antenna structure that can provide for transmitting a first channel simultaneously with a second channel, wherein the first channel is transmitted using directive beams and the second channel is transmitted using a wide beam and wherein the directive beams are for data communication signals and the wide beam is for navigation signals.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of methods and apparatus, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which.

DETAILED DESCRIPTION

Figure 1:
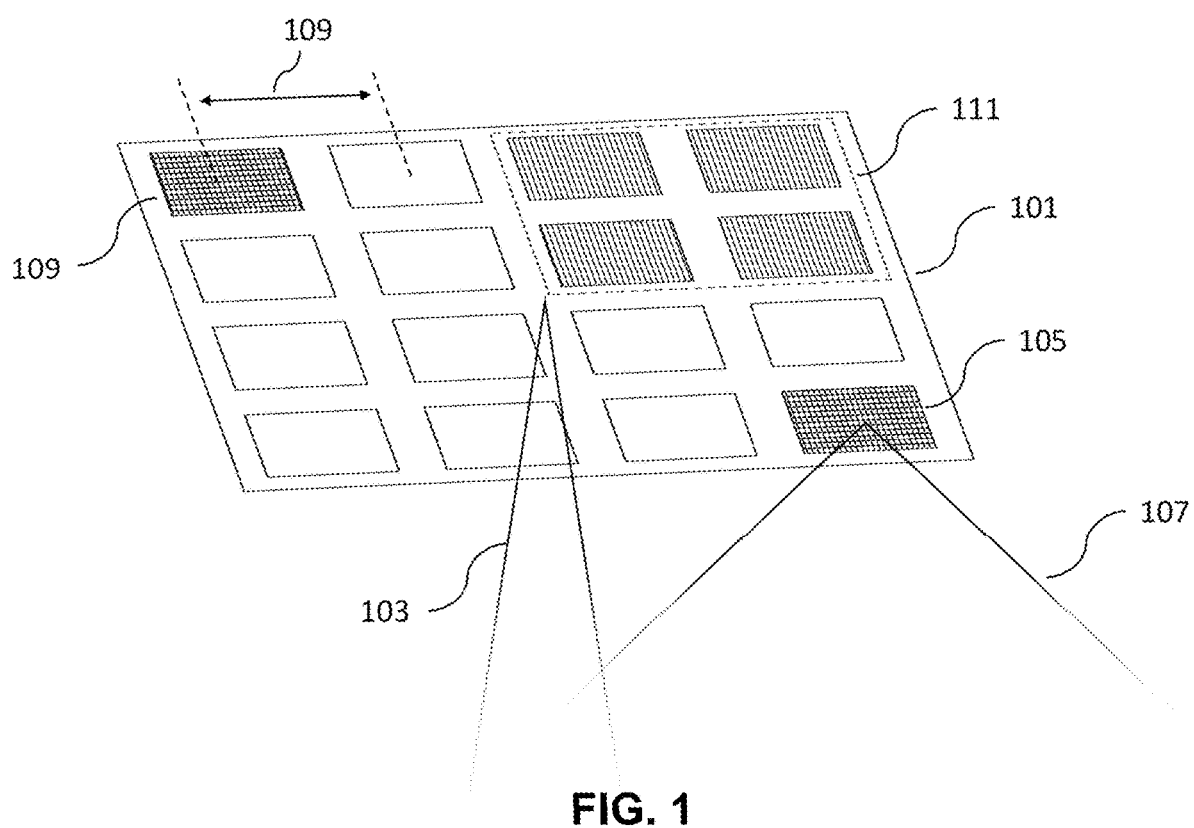
FIG. 1 is a diagram illustrating a phased array as might be used in an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

According to some embodiments, the techniques described herein can be implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques. The present disclosure describes several embodiments of a space-based cellular communications constellation.

Such geolocation and sets of navigation parameters can be incorporated in search and rescue applications and for optimizing communications network operations.

Terminals

A terminal might be some electronic user equipment that interacts in some way with a satellite or satellite signals. Examples might include user equipment (UE) that is configured or designed for using some protocol or protocols, a mobile phone, which might be a full-featured smartphone or otherwise, or some Internet-of-Things (IoT) connected device. In many cases, it might be assumed that the terminal is portable in that it can be easily moved from place to place and in operation is typically stationary or that a terminal is mobile in that it needs to be designed to operate while being moved relative to the surface of the Earth.

Examples of terminals include mobile phones, cellular phones, smartphones, and other devices equipped to communicate with a particular satellite. It should be understood that an operation, function or characteristic of a terminal might also be that of a station that is effectively or functionally a mobile station, but is not at present mobile. In some examples, the terminal might be considered instead a portable station that can be moved from place to place but in operation is stationary, such as a laptop computer with several connected peripherals and having a cellular connection, or the terminal might be stationary, such as a cellular device that is embedded in a mounted home security system. A terminal might be referred to as a terrestrial mobile device, a user receiver, user equipment (UE), or the like.

A terminal might be designed for use in a terrestrial cellular network. However, some terminals could be designed with modified communications services to handle GNSS signals that are outside a scope of a terrestrial cellular network protocol used by the terminal. Modifications to a terminal might or might not require changes to the chips, firmware, application software, and/or frequencies of operation in the terminals. Thus, for some terminals, GNSS functionality could be obtained using the terminal's existing protocol elements such as frequency, modulation, coding, etc., and would not require substantial modifications. Modifications might be limited to software or firmware update on the terminals, or no change.

As explained herein, a terminal might receive navigation signals from a satellite of a GNSS network and the satellite might also be used to send point-to-point data transmissions to specific terminals, whereas the navigation signals might be widely available to many terminals. A terminal can receive those navigation signals, decode the signals into data, and process the data to find a navigation solution, perhaps in the form of a set of navigation parameters the terminal can use.

Satellites

A satellite might be an object, vehicle, etc. that is configured, designed, constructed, etc. to operate in an orbit, such as an Earth orbit, perhaps designed consistent with a particular orbital altitude as a design target and/or a particular orbital orientation. A satellite might include various electronic components that allow for communication among satellites, communication with fixed ground stations that are specific to satellite support, command, control, etc., and/or communication with terrestrial devices such as terminals.

A satellite need not be in orbit to perform a function described herein. For example, the present disclosure can encompass a system that could be deployed in orbit but that is operating on Earth, either in a testing mode or a production mode.

A satellite might be capable of transmitting signals over beam patters and a network of satellites might provide cellular coverage of any location on the Earth with one or more beams using one or more satellites simultaneously. Each beam might implement a full-duplex bandwidth for simultaneous uplink and downlink communications using protocols such as Global System Mobile (GSM); or Frequency Division Duplex (FDD) or Time Division Duplex (TDD) Long Term Evolution (LTE); or Frequency Division Duplex (FDD) or TDD 5G New Radio (NR). Some beams could implement receive-only operations to support uplink measurement of signals from terminals or base stations on the ground.

Cells of a cellular communication network might be implemented via narrow beams wherein each beam serves as a cell (e.g., a Base Transceiver Station (BTS), Enhanced Node B (eNB), or gNB). These cells could employ standard control and user plane channels typically implemented in a common GSM, LTE, NR, etc., network. One of these control channels might be the BCCH channel or the Broadcast Control CHannel.

Constellations

In one embodiment, the satellite communications constellation might deploy thousands of satellites in Low Earth Orbit (LEO) at an altitude of approximately 500 km. The orbits might be circular or elliptical in shape. Other embodiments may deploy fewer or more satellites in orbits lower than or higher than 500 km. For simplicity, in one embodiment, the orbit configuration might be consistent with a Walker Style constellation. In this configuration, the satellites are placed in orbits with common altitudes. The satellite positions may be evenly spaced within inertial planes around the Earth where the inertial planes are equally spaced around the Earth with planes of satellites equally, at least approximately, spaced in inertial longitude of the ascending node.

Large-scale LEO constellations of hundreds and thousands of satellites might be primarily designed for communications services, but they can also be configured as transmit platforms in orbit that could provide enhanced GNSS services compared to their predecessors, as explained herein. With thousands of satellites in a constellation, a terminal anywhere on Earth might have a line-of-sight path to enough distinct satellites to quickly gather navigation signals and compute a navigation solution for the terminal. Line-of-sight might be a state of a satellite being above a horizon relative to the terminal. Many large-scale LEO constellations target transmission frequencies in the range of 11 to 50 GHz, and that spectrum can suffer from significant link loss due to propagation, atmospheric, fading, and foliage effects. As a result, such satellite systems might typically be designed with directive antenna technologies (small dishes for users) to receive high SNR communications services across more limited coverage areas. Both of these design factors can limit coverage for GNSS usable signals to high elevation angles, reducing the value of the number of satellites available above the horizon.

Large-scale LEO constellations designed for communications services are typically designed to provide these services to user terminals with the user terminals having unique hardware designed specifically for compatibility with the constellation providing the service. Typically, these user terminals are static or in a fixed location on the Earth. This presents several challenges for GNSS solutions to handsets since the links are not typically between satellites and mobile equipment. Since the satellite user's fixed terminal receives the satellite signals, peripheral devices, such as computers, mobile phones, etc., can only infer their distances from the fixed user terminal and cannot typically resolve their location. Embodiments described herein can provide a GNSS satellite system that improves on existing and planned solutions that will even support existing legacy cell phones, including those without built-in GPS receivers.

Phased Array

As explained herein, a satellite network might be used to provide GNSS functionality for terminals that are designed to communicate with current and future terrestrial 3GPP networks, but not necessarily with a GNSS system. A satellite communications system in LEO designed for communications services might deploy simultaneous GNSS services.

To facilitate high SNR links for broadband mobile services, the satellites might employ directive, and perhaps steerable, antenna technologies, such as phased arrays. AS phased array might comprise a number of individual antenna elements, which might be arranged in a grid, a rectangle, a line, a square, a hexagon, or some two-dimensional (2D) pattern of antenna elements. Together, the collection of antenna elements can form a phased array with a radio system coordinating signals to be transmitted from each of a plurality of antenna elements and based on the coordination of signals might transmit over a beam being having a desired lobe pattern.

An individual antenna element of the phased array can be used for wide beam transmissions, such as in-band, lower SNR transmissions that can be used for wide area coverage. Since the spacing of satellites in the constellation might be designed based on coverage from higher directivity, narrower beams, or array factors, a wider field of view can provide signals from many satellites to a receiver anywhere around the planet. This can speed resolving a navigation solution.

The directivity dictated by the lobe pattern of the antennas may vary based on altitude, the field of coverage, and desired capacity/user data rates. Phased arrays can easily employ beam steering of multiple simultaneous beams to support seamless, high SNR coverage across a wide satellite footprint. A steerable phased array antenna may use antenna elements with wide beam patterns, such that appropriate spacing of antenna elements can accommodate beam steering off boresight angles of higher degrees. For instance, a highly directional phased array may employ antenna elements with full cone, half-power beamwidth radiation patterns as wide as 60, 90, or 120 degrees. Other implementations may use many low gain antenna elements to produce appropriate directivities and steerabilities from the array factor.

A constellation of satellites might use phased arrays on board to steer a beam, or beams, at a single location on Earth. The result might be a circular or oval coverage polygon on the Earth's surface describing the coverage area for that beam or cell. In a typical LTE network, a radio transceiver station that deploys a cell like this might be referred to as an eNB or eNodeB. 2G and 5G networks may refer to these transceiver stations as BTS or gNB, respectively.

Data Transmissions

For data communications, a satellite might be part of a constellation that forms a space-based network of satellites designed to communicate with standard mobile handsets according to some pre-agreed protocol. Examples of data communication technologies and protocols include TDMA, FDMA, OFDMA, 3GPP technologies such as GSM (2G), CDMA (3G), UMTS (3G), LTE (4G), NR (5G), and/or others. Examples and details are provided in Speidel I through Speidel IV.

Data transmissions might be for sending messages from a ground station, to a satellite, and then having the satellite forward the message to the terminal using protocols the terminal is programmed or configured for. For example, the satellite might send a transmission using a protocol that a standard smartphone could receive.

GNSS Transmissions

A GNSS transmission might involve a satellite emitting a navigation signal that can be received by a terminal or a large number of terminals in a large footprint of the navigation signal. As navigation signals need not be specific to any one terminal, they can be broadcast over a wide beam, so that any terminals that are within range (such as line-of-sight) of a satellite can pick up that satellite's navigation signals, combine navigation signals, and compute a navigation solution to derive a set of navigation parameters. While multiple terminals might receive a navigation signal from a satellite, each of them might compute a different navigation solution reflecting the fact that different states (such as position, velocity, etc.) of different terminals could result in the navigation signal appearing different to different terminals.

The frequencies used for deploying the GNSS navigation signals may be in the same bands used for service links, TT&C links, or feeder links. This can be done by implementing a guard band or in-band implementation of the GNSS signals. The GNSS signals may also use a frequency different from the service links, TT&C links, or feeder links. Unlicensed bands (e.g., ISM) may be used over certain geographies.

Furthermore, existing elements of the protocols used for the service links, TT&C links, or feeder links might be used for the GNSS signals, such as existing modulation and coding schemes (mod-cods, or MCS, etc.), control plane channels, or data plane channels. As an example, a system information block (SIB) in a Broadcast Control Channel (BCH) in a control plane of the LTE air interface protocol could be used to transmit the needed navigation message or other GNSS information.

Navigation parameters related to geolocation can be changing as a terminal is moving. While satellites in orbit are not stationary, they are typically in well-characterized orbits with a location known to good precision at times that are precisely known. A satellite's two-way Doppler shift, a terminal's radio emissions, and the round-trip time delays can be measured onboard the satellite with sufficient accuracy to provide useful geolocation fixes for the network and for end-user purposes.

Satellite constellations or space segment networks in orbit around the Earth may be deployed for high-SNR telecommunications or data services to a terminal and in parallel can provide signals that can used for determining some of a terminal's navigation parameters and a navigation solution that could indicate to a terminal its current position, a current time, or other navigation or state details.

As explained herein, a satellite network might be used to provide a separate GNSS solution for terminals, such as standard smartphones and cellphones, that are designed to communicate with current and future terrestrial 3GPP networks, but not necessarily with a GNSS system. A satellite communications system in LEO designed for communications services might deploy simultaneous GNSS services.

An architecture of a satellite communications system is described for providing GNSS solutions using a common communications platform and infrastructure. Directive technologies, such as phased arrays, often provide optimal solutions for communications systems that desire to optimize link SNRs for higher throughput links. Since GNSS links need not require high throughput links, they might be deployed with individual, or smaller groups, of individual antenna elements in a larger phased array. Alternatively, a separate, low gain, wide beamwidth antenna might be installed on the satellite as a dedicated aperture for GNSS signals.

Variations of phased array activation might be used as well. Based on the desired beamwidth of the GNSS relevant radiating antenna elements, the system may use multiple antenna elements in a "smaller" phased array with "some" directivity—not as much as the entire array but more than an individual antenna element.

MIMO techniques could be leveraged in a certain implementation. Multiple, individual antenna elements in the phased array, or separate phased arrays, with enough separation, can increase throughput and link budget for the GNSS type services deployed by the satellite. Examples may include antenna elements widely separated in a large, phased array, antenna elements on separate phased arrays, or antenna elements on separate phased arrays on separate satellites.

The use of low frequency (e.g., sub 1 GHz or some low frequency) cellular bands provides favorable propagation characteristics of signals, enabling wide area coverage. A telecommunications service deployed in orbit may leverage a variety of frequencies, but some may be more suitable for wider area fields of coverage and support lower path loss and better link budgets.

The system might be an LTE system in orbit and could use guard bands in LTE (180 kHz blocks) for GNSS frequency blocks. The GNSS RF spectrum could be broken into multiple orthogonal carriers (like LTE). This might take a form similar to the NB-IoT PHY protocol structure for deploying GNSS in the guard band or even doing it "in-band". Alternatively, the guard band implementation could be GSM channels between LTE blocks.

Combined Transmissions on a Phased Array

FIG. 1 is a diagram illustrating a phased array as might be used in an embodiment. A phased array might comprise multiple antenna elements in a two-dimensional pattern. Individual antenna elements within, or subsections of, a phased array can generate more widespread signals by using wider beams. Using the entire phased array and coordinating the signals emitted from antenna elements can generate a highly directive main lobe, which might be used, or needed, for high SNR communications services.

As shown in FIG. 1, a square pattern phased array 101 comprises multiple individual antenna elements that together can generate a directive beam 103, which might be used for high SNR telecommunications services. Directive beam 103 might be steerable across a field of view, ultimately defined by the relative spacing of the 4 by 4 array of antenna elements 109 and a beamwidth of a radiation pattern 107 of an individual antenna element 105. Individual antenna elements in the phased array can be activated for GNSS signal generation to achieve more widespread signal relevance. Multiple individual antenna elements might be used on a common phased array 101, and sub-arrays such as 111 and 105 to provide redundant or additional signals. Furthermore, sub-sections 111 of the array might be activated for a slightly more directive beam than an individual antenna element but less directive than the main beam 103.

Figure 2:
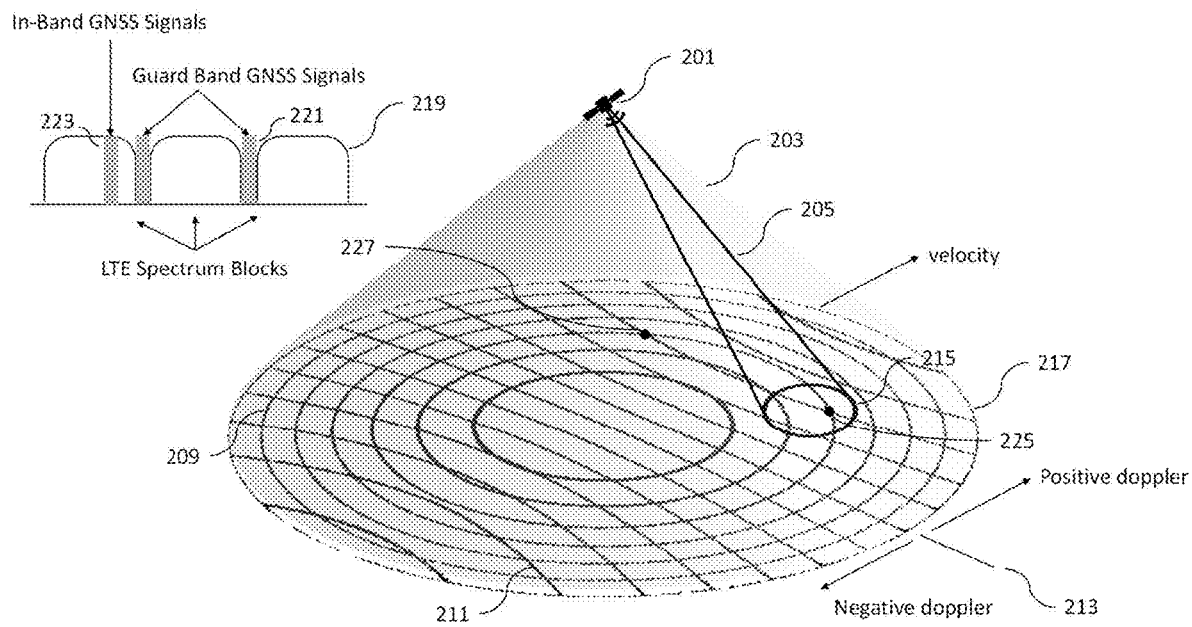
FIG. 2 is a diagram illustrating a satellite on orbit as might be used in an embodiment.

FIG. 2 illustrates how a phased array might be used to project beams onto the Earth's surface using a main highly directive beam, 205, and a wide beam pattern, 203. FIG. 2 illustrates a satellite on orbit, which has a field of view of the Earth that can be characterized in terms of Doppler Shift and propagation delay (or range) using a contour of overlapping concentric circles (range contours) and approximately parabolic lines (Doppler contours). The Doppler contour lines would be precisely parabolic if the Earth were flat, but for purpose of explanation it can be noted that they are slightly modified parabolic sections of a cone cut by an oblate spheroid rather than the simple conic section. A directive beam is illustrated, 205, providing high SNR services within a small spot beam portion of the field of view. Wide beam antennas can cover a much larger contour area within the satellite field of view.

As shown in FIG. 2, a satellite 201, perhaps equipped with a phased array, has a field of view of the Earth 203, which might be covered by one antenna element in the larger phased array. A directive beam 205 from the phased array may result in a localized signal spot beam 215 on the Earth designed for high SNR telecommunications services. An individual antenna element, or a subset of antenna elements, of the phased array, may result in a wider signal spot beam 217 on the Earth. The spot beams would cover the satellite field of view, described with Doppler contours 211 and Range contours 209. To support compatibility between the wide beams (for GNSS) and narrow beams (for high SNR services), there may be a spectrum sharing/coordination arrangement. For instance, main beam(s) 215 may deploy LTE spectrum blocks of some bandwidth 219 dedicated for telecommunications/data services. Wide beams 217 may deploy narrow signal bandwidths in the LTE spectrum block guard bands 221 or in-band 223. Multiple signals might be sent at the same time, using multiple frequency blocks and a number of multiple access schemes such as OFDMA, TDMA, or FDMA.

Depending on capacity, a satellite might allocate different time slots or different LTE resource blocks to improve the GNSS resolution at the temporary expense of telecom traffic capacity. By allocating more spectral resources to the GNSS services in terms of bandwidth, power, and time, the geographic resolution might be improved. Wider bands might allow for improved measurement and finer resolutions. Averaging over time can also be done, if smearing due to fast-moving satellites is taken into account.

A satellite's measurement of a transmission delay and a Doppler shift of communication with a terminal allows for computation of contour lines and evaluating where they intersect. This can provide good estimates of the geolocation of the terminal. However, there is the likely possibility that the approximately parabolic Doppler contour line will intersect the approximately circular timing contour circle at two places, leading to ambiguity when solving for the location parameters. This is illustrated in FIG. 2, where a device may be operating at a location, 215, within the satellite's field of view. In this example, the Doppler shift and delay measurement at the satellite results in two possible position solutions 225 and 227 based on the intersection of the measured Doppler shift and delay contours. Considerations of the power at the two possible locations can often help resolve the ambiguity, particularly when the satellite is steering a directional beam 205 toward a perpendicular location to the ground path.

Furthermore, the measurement of the Doppler shift and time delay on the air interference link can be conducted in various places in the system. For instance, the terminals themselves may be capable of measuring the Doppler shift and the time delay over the link between it and a satellite. This, combined with information about the transmitted carrier frequency of the satellite (which can be used to measure the Doppler shift) and the ephemeris of the satellite allows for the computation of a position estimate of the terminal on the Earth. This could also be done by a ground station, which might form a link with a terminal through a satellite as a bent pipe.

The Doppler shift on the link can be measured, generally, by comparing the receive frequency to the satellite transmit frequency (which may vary as a function of time). The terminal can measure time delay in various ways. One example is that the satellite sends a time stamp in the BCCH, other control channel, or other traffic channel, which is used to compare to the received timestamp. Another way might be to have the satellite send a timing advance to the terminal, possibly using conventional cellular protocols, but with a higher value than typical limited terrestrial distance timing advances. The delay and time measurements can be used along with the ephemeris of the satellites (delivered either by terrestrial means or space network) to compute a location relative to a satellite ephemeris. This may be done over multiple RF bursts, from one or more satellites, to hone in on a more accurate position.

Navigation Signals

Navigation services could be provided from a mixture of timing, Doppler shift, and attitude measurements determine the position of a terminal and attitude and geography information might be used to resolve ambiguities in the fix determinations. Satellites could operate at distances from each other of tens, hundreds or thousands of kilometers, allowing the opportunity for multiple satellites in a constellation to receive signals from the ground and more accurately measure Doppler Shift and delay to support positioning computations by the network, or the terminals, to solve for a set of navigation parameters for the terminals, as illustrated in FIG. 3.

Additionally, the terminals may be capable of listening to and measuring the timing and Doppler shift on signals from multiple satellites at one time, which may have overlapping wide beams, or overlapping directive beams, and may be on the same or different carrier frequencies. With this, multiple measurements can be made simultaneously, and these multiple measurements can be used to compute a higher accuracy for position or other navigation parameters, directly on the terminal, without requiring any other separate GNSS signals.

Figure 3:
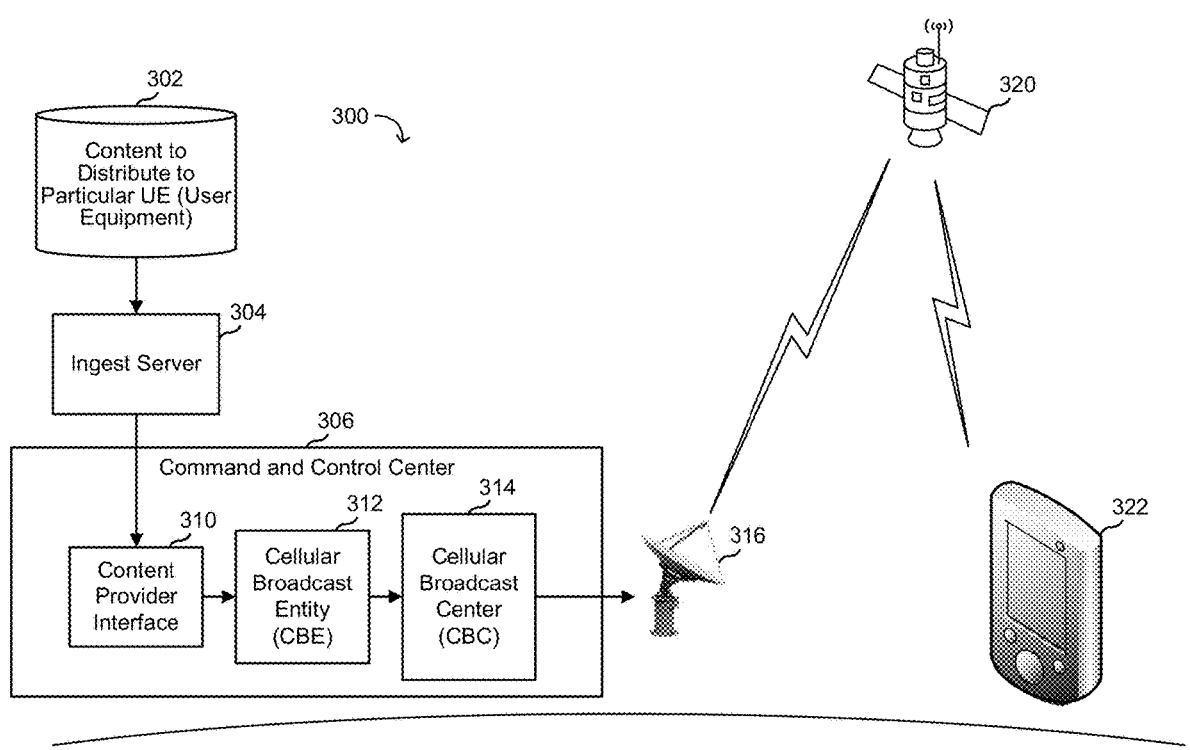
FIG. 3 illustrates an example of conveying content to a terminal via cellular broadcast messages, according to an embodiment.

FIG. 3 illustrates a process for geolocation of a terminal by finding an intersection of a range contour curve and a Doppler shift contour curve where the timing advance and the Doppler shift are measured from an uplink RACH Channel Request message and subsequent uplink messages. There is the potential for ambiguity among two solutions to the intersection of these two curves, but this can be resolved by considering the signal strength on the ground at those two possible fixes. The ambiguity is greatly reduced when the satellite attitude is pointed to one side of its cross-track direction so that the two ambiguous roots are far apart from the path with one receiving the full strength of the directional beam while the other is substantially weaker. Fixes using measurements from multiple satellites and various times can also improve accuracy and resolve the ambiguity.

Broadcast Control Channel

Some GNSS services might be able to be provided using, at least in part, a broadcast control channel. A broadcast control channel is often used as a one-way communications mechanism to deliver "cellular broadcast" (CB) messages in a one-to-many fashion. CB is a transmission of a text-type message that is slightly different in appearance from a standard SMS in that it is displayed on the home screen of a mobile device and can have a distinct warning tone sound.

In one protocol, the maximum length of a cellular broadcast message is 1395 characters. Specifically, CB messages comprise up to 15 pages and each page is limited to 93 alphanumeric characters per message. A full CB message can be sent every 1.79 seconds. For instance, in the GSM protocol, a CB message can be delivered using four SDCCH channels every "multi-frame." One multi-frame is 51 frames, where frames comprise eight timeslots, each timeslot duration being 576.9 microseconds. A multi-frame is approximately 0.235 seconds. Each SDCCH channel of CB data can include 41 bits, totaling 184 bits every 0.235 seconds. Therefore, a GSM embodiment's peak CB data rate would be approximately 781 bps. This data rate is superior to some the existing GNSS system deployed by the GPS constellation, which has a bit rate of 50 bps, so a navigation message of the same size can be delivered an order of magnitude faster using the CB protocol. Furthermore, the CB channel leverages the lowest mod-cod in the protocol specification. For example, in GSM, this might be GMSK with an encoding rate of 0.533. In LTE, this might be QPSK with an encoding rate of 0.0762. These modulation and coding schemes may have sufficient link closure at SINR levels greater than 7 dB and −5 dB, respectively.

The CB operates on channels differently than the mobile networks' channels dedicated for voice, SMS, and data and thus does not contribute to network congestion. A CB message is sent from the mobile networks' core network with an identifier called the "Message ID." Mobile phone users can make configuration changes on their handsets to display various alert message types to the mobile phone user. Most mobile phones come pre-configured for specific Message IDs that are important, such as Presidential Alerts. Configuration changes might involve changing the Message ID or Message IDs allocated for specific emergency alerts.

Some handsets are pre-allocated for receiving specific Message IDs for CB. These Message IDs may include those allocated for the Earthquake & Tsunami Warning System (ETWS) or similar natural disasters and weather conditions. Some are allocated for lost or kidnapped children (e.g., AMBER alerts). Others are allocated for large-scale government messaging to nationwide populations (e.g., Presidential alerts).

Thousands of Message IDs can be utilized in the cellular broadcast channel. Of these thousands, only tens to hundreds are already allocated for certain CB content (e.g., message ID 4352 is for earthquake warning, 4353 is for tsunami warning, 4370 is for Presidential alerts, etc.). Message ID's 0-999 are not allocated for any cellular broadcast content. Message IDs 1001 through 1003 are for Differential GPS Correction Data, GPS Ephemeris, and Clock Correction data for GPS Almanac and other similar data supporting assisted GPS.

Each satellite in a space network might be programmed to consistently broadcast a CB message to areas of service for each deployed beam. The broadcast messages may use the same Message ID to be understood for the GNSS system. Application software on each handset may understand to pull broadcast messages on this Message ID to collect the navigation message. The pages of the CB Message could be encoded with the appropriate navigation message field values.

Alternative Methods for GNSS Using Telecommunications Protocols

In Speidel I, a method is disclosed to measure the Doppler shift and the delay of RACH signals from terminals operating as UEs operating on a mobile space network compatible with LTE and GSM devices. These measurements can be used to compute the location of the terminal/UE within the satellite footprint. This information could be computed by the satellite-based on RACH signals and delivered to the user using standard two-way delivery protocols, such as SMS or push notifications.

The typical control plane channels leveraged by GSM or LTE could be redesigned to accommodate GNSS relevant signaling. Existing control plane features could be leveraged or repurposed for GNSS-type services to support this.

FIG. 3 illustrates an example of conveying content to a UE via cellular broadcast messages, according to an embodiment.

FIG. 3 illustrates an example 300 of conveying content to a UE via cellular broadcast messages, according to an embodiment. As illustrated there, to be distributed to the UE is stored in storage 302 and provided to an ingest server 304. A command-and-control center 306 can receive content from ingest server 304 and provided to a content provider interface 310. A cellular broadcast entity (CBE) 312 and receive data from content provider interface 310 and provide them to a cellular broadcast center (CBC) 314, which in turn can construct cellular broadcast messages and convey those to an uplink ground station 316 and provide those in a proprietary protocol or a standard protocol to an orbital base station 320. In some embodiments, the CBE and the CBC are implemented in a command-and-control center and/or, in others, on the satellite.

Orbital base station 320 can transmit a signal, such as those described in Speidel I, for receipt by the user equipment 322 possibly using conventional cellular broadcast protocols. Orbital base station 320 can transmit signals to terrestrial user equipment with particular delay characteristics and Doppler shifts as explained in more detail herein.

Terminal Adaptations

The typical 3GPP protocols, such as GSM, LTE, NR, etc., only allow user equipment (UE) to lock onto one BTS carrier frequency or one eNB's primary component carrier frequency. Since fundamentally, only one eNB can serve a UE in a given cell in the LTE protocol, there may be only one satellite beam with the main lobe directed at the UE in the serving area. As a result, the UE can only receive information on one BCCH channel from one satellite at a time. The protocol could be modified to allow the UE to listen to the BCCH from multiple satellites, which would allow it to receive information that it needs for the navigation solution more rapidly. This solution might be implemented as a software application or firmware modification on handsets.

The terminal might receive the navigation message from multiple satellites throughout multiple overpasses. To get at least four satellite navigation messages, the terminal may need to wait for 8 to 12 minutes. This means if the terminal does not move at all in 12 minutes, it might get an accurate set of navigation parameters and thus an accurate navigation solution. This might be useful for applications where the terminal is, in fact, stationary almost always, such as an IoT-type device that might be portable but largely operates while stationary.

Terminals might derive both their local RF oscillator and their data clocks from the received downlink signal from a spacecraft in a constellation. For increased accuracy, the satellite might implement high accuracy telemetry for the on-orbit ephemeris (state vectors) with very accurate, perhaps atomic clocks. Examples are described in ETSI EN 300912 § 6.1 to § 6.2].

Hardware Examples

Figure 4:
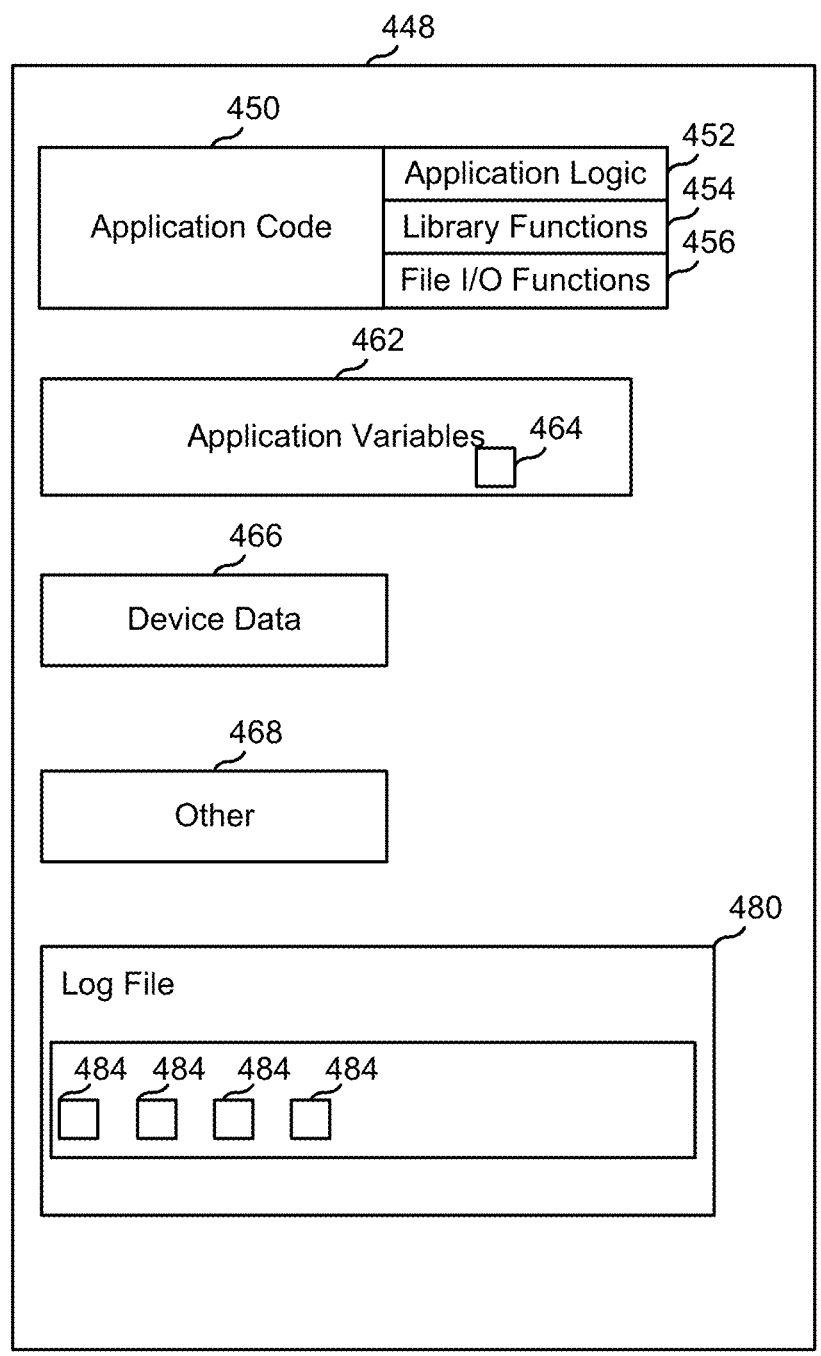
FIG. 4 illustrates an example computer system memory structure as might be used in performing methods described herein, according to various embodiments.

FIG. 4 illustrates an example of data structures that might be present in memory or storage accessible to computer processors. In some embodiments, the data structures are used by various components and tools, some of which are described in more detail herein. The data structures and program code used to operate on the data structures may be provided and/or carried by a transitory computer readable medium, e.g., a transmission medium such as in the form of a signal transmitted over a network.

According to some embodiments, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying data that includes data having been processed by the methods described herein. The carrier medium can comprise any medium suitable for carrying the data, including a storage medium, e.g., solid-state memory, an optical disk or a magnetic disk, or a transient medium, e.g., a signal carrying the data such as a signal transmitted over a network, a digital signal, a radio frequency signal, an acoustic signal, an optical signal or an electrical signal.

Figure 5:
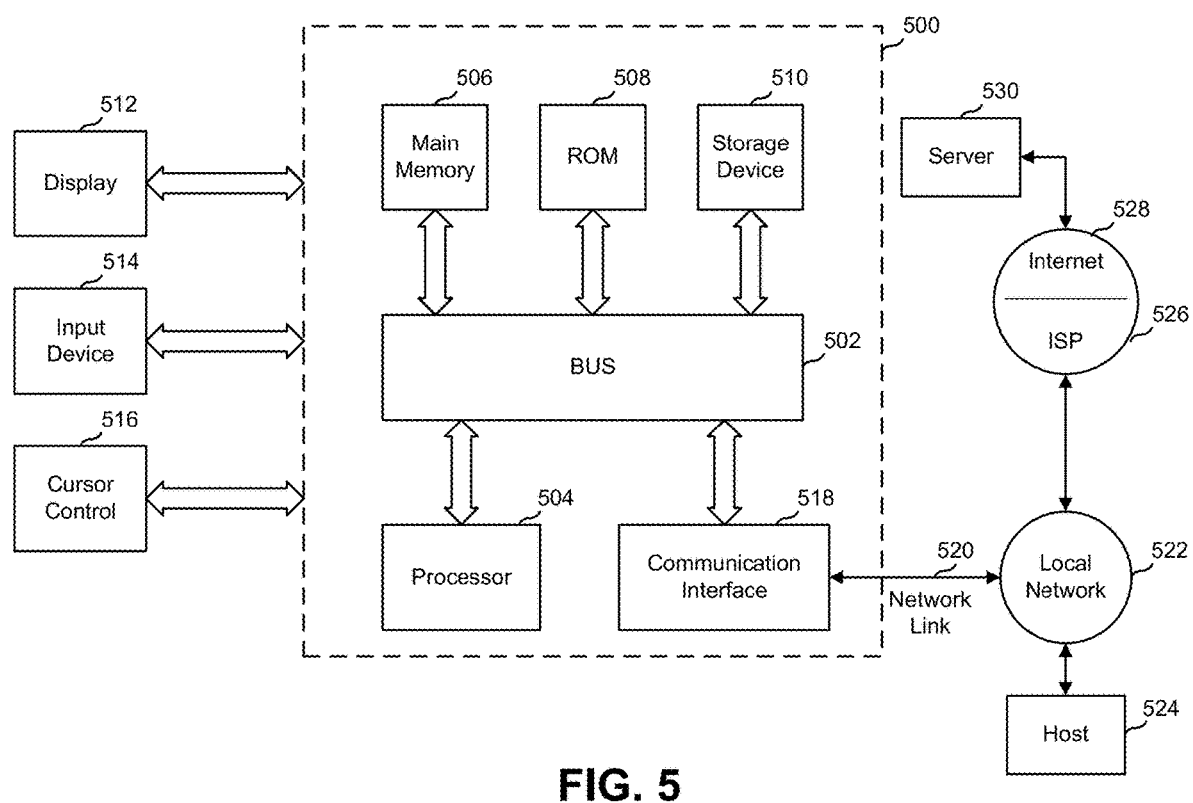
FIG. 5 is a block diagram illustrating an example computer system upon which the systems illustrated in FIG. 4 may be implemented, according to various embodiments.

FIG. 5 is a block diagram that illustrates a computer system 500 upon which the computer systems of the systems described herein and/or data structures shown in FIG. 4 may be implemented. Computer system 500 includes a bus 52 or other communication mechanism for communicating information, and a processor 54 coupled with bus 52 for processing information. Processor 54 may be, for example, a general-purpose microprocessor.

Computer system 500 also includes a main memory 56, such as a random-access memory (RAM) or other dynamic storage device, coupled to bus 52 for storing information and instructions to be executed by processor 54. Main memory 56 may also be used for storing temporary variables or other intermediate information during execution of instructions to be executed by processor 54. Such instructions, when stored in non-transitory storage media accessible to processor 54, render computer system 500 into a special-purpose machine that is customized to perform the operations specified in the instructions.

Computer system 500 further includes a read only memory (ROM) 58 or other static storage device coupled to bus 52 for storing static information and instructions for processor 54. A storage device 510, such as a magnetic disk or optical disk, is provided and coupled to bus 52 for storing information and instructions.

Computer system 500 may be coupled via bus 52 to a display 512, such as a computer monitor, for displaying information to a computer user. An input device 514, including alphanumeric and other keys, is coupled to bus 52 for communicating information and command selections to processor 54. Another type of user input device is a cursor control 516, such as a mouse, a trackball, or cursor direction keys for communicating direction information and command selections to processor 54 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 54 executing one or more sequences of one or more instructions contained in main memory 56. Such instructions may be read into main memory 56 from another storage medium, such as storage device 510. Execution of the sequences of instructions contained in main memory 56 causes processor 54 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 510. Volatile media includes dynamic memory, such as main memory 56. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 52. Transmission media can also take the form of acoustic or light waves, such as those generated during radio-wave and infra-red data communications.

Various forms of media may be involved in carrying one or more sequences of one or more instructions to processor 54 for execution. For example, the instructions may initially be carried on a magnetic disk or solid-state drive of a remote computer. The remote computer can load the instructions into its dynamic memory and send the instructions over a network connection. A modem or network interface local to computer system 500 can receive the data. Bus 52 carries the data to main memory 56, from which processor 54 retrieves and executes the instructions. The instructions received by main memory 56 may optionally be stored on storage device 510 either before or after execution by processor 54.

Computer system 500 also includes a communication interface 518 coupled to bus 52. Communication interface 518 provides a two-way data communication coupling to a network link 520 that is connected to a local network 522. For example, communication interface 518 may be a network card, a modem, a cable modem, or a satellite modem to provide a data communication connection to a corresponding type of telephone line or communications line. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520, and communication interface 518. In the Internet example, a server 530 might transmit a requested code for an application program through the Internet 528, ISP 526, local network 522, and communication interface 518. The received code may be executed by processor 54 as it is received, and/or stored in storage device 510, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A satellite communications system comprising:
at least one satellite;
an antenna structure deployed on the at least one satellite; and
radio hardware coupled to the antenna structure configured to provide for transmitting a first channel simultaneously with a second channel to a user terminal, wherein the first channel is transmitted using directive beams and the second channel is transmitted using a wide beam and wherein the directive beams are used to transmit data communication signals and the wide beam is used to transmit navigation signals, wherein first frequencies used to transmit the navigation signals are within guard bands within a frequency band used to transmit the data communication signals.

2. The satellite communications system of claim 1, wherein the at least one satellite is deployed in Low Earth Orbit.

3. The satellite communications system of claim 1, wherein the data communication signals on the first channel and the navigation signals on the second channel are deployed with a common phased array antenna, wherein the data communication signals are transmitted using multiple array components of the common phased array antenna, and wherein the navigation signals are deployed using fewer array components than the data communication signals.

4. The satellite communications system of claim 1, wherein a wide beamwidth Global Navigation Satellite System (GNSS) signal is transmitted through a common phased array antenna as a superposition of phase and amplitude weights that produce a wider beam than the directive beams used for data communication.

5. The satellite communications system of claim 3, wherein the fewer array components comprise an individual antenna element, or a group of antenna elements, in the common phased array antenna.

6. The satellite communications system of claim 1, wherein the first frequencies used for the navigation signals and second frequencies used to transmit the data communication signals are both within a common frequency band.

7. The satellite communications system of claim 1, wherein communications services are provided simultaneously with GNSS services using directive beams for the communications services.

8. The satellite communications system of claim 7, wherein a Doppler shift measurement and a time delay measurement in a ground-to-satellite uplink determines a set of navigation parameters independent of a GPS receiver in the user terminal.

9. The satellite communications system of claim 7, wherein one or more of a satellite attitude determination, mechanical beam steering, and/or electronic beam steering directs radio frequency power and radio frequency signals to a region on Earth, and wherein the satellite communications system is configured to resolve an ambiguity in determination of geographic fixes.

10. The satellite communications system of claim 7, wherein a set of navigation parameters are computed on the satellite and sent to the user terminal.

11. The satellite communications system of claim 10, wherein the set of navigation parameters are for navigation, mapping, precision time determination and/or providing geolocation confirmation of a location to an application.

12. The satellite communications system of claim 1, wherein one control plane channel or more than one control plane channels are used to distribute one broadcast navigation message or more than one broadcast navigation messages.

13. The satellite communications system of claim 1, wherein the radio hardware includes a phased array antenna used for both the directive beams and the wide beam.

14. The satellite communications system of claim 13, wherein the phased array antenna comprises a plurality of array antenna elements, wherein the radio hardware provides a navigation signal to a selected subset of the plurality of array antenna elements while providing a data communication signal to each of the plurality of array antenna elements according to a phased array pattern.

15. The satellite communications system of claim 1, wherein the second channel is encoded to form a pseudo-random noise (PRN) signal.

16. A user terminal, for use with a satellite communications system, the user terminal comprising:
an antenna; and
radio hardware, coupled to the antenna, used for receiving satellite signals from at least one satellite base station,
wherein the satellite signals comprise signals transmitted simultaneously over a first channel and over a second channel,
wherein the first channel carries data communication signals in a frequency band and transmitted using directive beams,
wherein the second channel carries navigation signals in first frequencies within guard bands within the frequency band and transmitted using a wide beam, and
wherein the user terminal is configured to receive control channels from multiple base stations simultaneously, including the at least one satellite base station, and decode a navigation message from each of the multiple base stations simultaneously.

17. The user terminal of claim 16, wherein the at least one satellite base station is a satellite deployed in Low Earth Orbit.

18. The user terminal of claim 16, wherein the navigation signals comprise a wide beamwidth GNSS signal is transmitted through a common phased array antenna as a superposition of phase and amplitude weights that produce a wider beam than the directive beams.

19. The user terminal of claim 16, wherein the user terminal is configured to process a set of navigation parameters computed on at least one satellite base station and received by the user terminal.

20. The user terminal of claim 19, wherein the set of navigation parameters are for navigation, mapping, precision time determination and/or providing geolocation confirmation of a location to an application.

* * * * *